(No Model.)
J. H. EDWARDS.
ANIMAL TRAP.
No. 465,056. Patented Dec. 15, 1891.
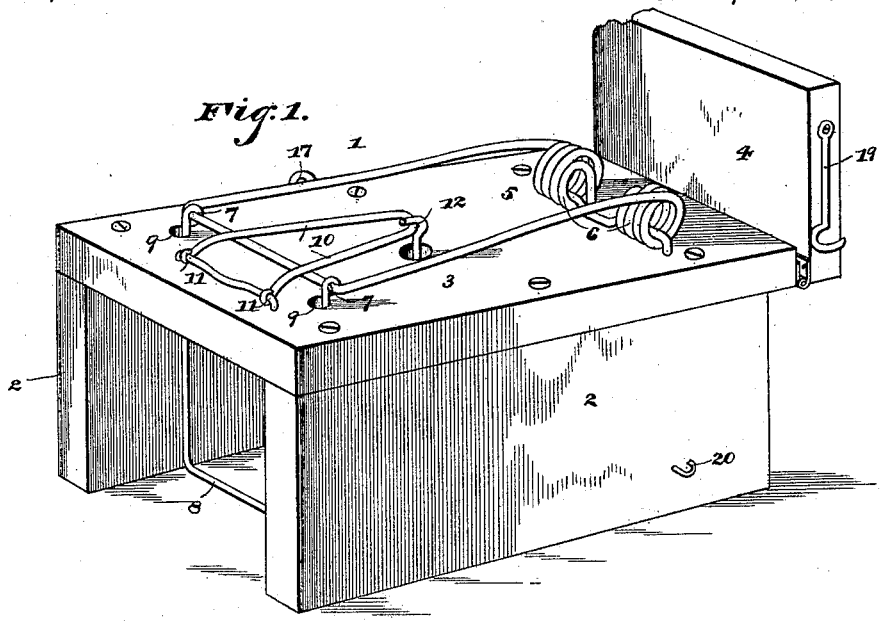
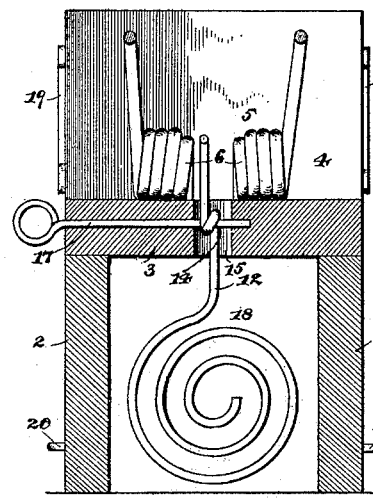
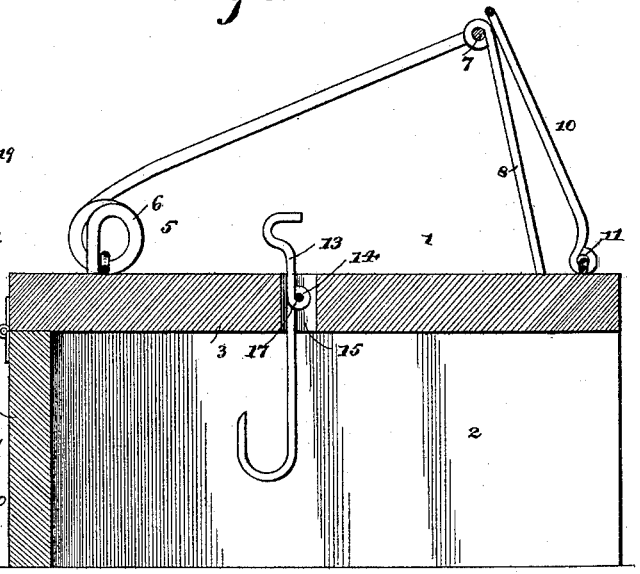
Witnesses
B. S. Ober
N. J. Riley
Inventor
Joseph H. Edwards
By his Attorneys,
C. A. Snow & Co.

UNITED STATES PATENT OFFICE.

JOSEPH H. EDWARDS, OF GIDDINGS, TEXAS.

ANIMAL-TRAP.

SPECIFICATION forming part of Letters Patent No. 465,056, dated December 15, 1891.

Application filed August 25, 1891. Serial No. 403,675. (No model.)

*To all whom it may concern:*

Be it known that I, JOSEPH H. EDWARDS, a citizen of the United States, residing at Giddings, in the county of Lee and State of Texas, have invented a new and useful Trap, of which the following is a specification.

The invention relates to improvements in animal-traps.

The object of the present invention is to provide a simple and inexpensive trap adapted to be readily set for catching rats, salamanders, prairie-dogs, skunks, snakes, and the like.

The invention consists in the construction and novel combination and arrangement of parts hereinafter fully described, illustrated in the accompanying drawings, and pointed out in the claims hereto appended.

In the drawings, Figure 1 is a perspective view of a trap constructed in accordance with this invention. Fig. 2 is a transverse sectional view showing the contact-trigger. Fig. 3 is a longitudinal sectional view, the bait-trigger being in position.

Referring to the accompanying drawings, 1 designates the body of a trap which is adapted for catching various small animals, such as are attracted by a bait and those which by their peculiar habits are caused to spring the trap by being brought in direct or indirect contact with the trigger. The body is rectangular in cross-section, and consists of vertical sides 2, a top 3, and a hinged door 4, which closes, when a bait-trigger is used, one end of the body, the other end being left open and forming an entrance to the trap. Arranged on the top of the trap is a spring 5, which is U-shaped, and is provided at one end with coils 6, secured to the body, and its other end is secured in eyes 7 of a striking-wire 8, arranged in perforations 9 of the top 3 and adapted to be sprung upward by the spring to confine an animal. The trap is set by a wire 10, which is U-shaped, and is provided with eyes 11, by which it is hinged to the front end of the top of the trap, and it is adapted to be engaged by an upper hooked end of a trigger 12, which is operated by being pushed, and which carries no bait, and by a trigger 13, which is provided at its lower end with a bait-hook and is adapted to be employed when the trap is set for catching rats and similar animals. The triggers are provided intermediate their ends with eyes 14, and are arranged in a central opening 15 of the top, in which opening they are pivoted by a removable pin 17, adapted to be withdrawn to permit one trigger to be changed to another. The trigger 12, which is operated by contact, has an open enlarged circular end 18, which is formed by coiling the wire, and which is designed to spring the trap by being pushed aside by animals, such as salamanders, moles, or the like, and it may be advantageously employed for trapping snakes, in which case an egg is placed back of the trigger. The hinged door is secured, when closed, by hooks 19, which engage eyes 20 of the body, and it is adapted to be raised to prevent an apparent free passage through the trap when the contact-trigger is employed, and to be closed when the bait-trigger is used.

It will be seen that the trap is inexpensive in construction, is strong and durable, and is adapted for catching a great variety of animals. It will also be seen that the trap may be readily changed to catch animals which are attracted by bait and is adapted for animals which by their peculiar habits may be caused to operate the trigger by contact with the same.

What I claim is—

1. A trap comprising the body composed of sides, a top having a central opening, and a hinged door arranged at one end of the body and adapted to be opened and closed to change the character of the trap, a striking-wire, a spring connected with the striking-wire, a setting-wire, a trigger arranged in the central opening, and a removable pin pivoting the trigger and enabling the same to be detached, substantially as and for the purpose described.

2. A trap comprising a body composed of sides and a top connecting the sides and provided with a central opening, a striking-wire, a spring connected with the striking-wire, a setting-wire, and a trigger pivoted in the central opening of the top and having its lower end convolutely coiled and forming an enlarged open circular end, substantially as and for the purpose described.

In testimony that I claim the foregoing as my own I have hereto affixed my signature in presence of two witnesses.

JOSEPH H. EDWARDS.

Witnesses:
J. W. WILLIAMS,
M. S. MENCHANT.